United States Patent
Fink

(10) Patent No.: US 9,688,381 B2
(45) Date of Patent: Jun. 27, 2017

(54) SUBFLOOR STRUCTURE WITH AN INTEGRAL HULL FOR A ROTARY WING AIRCRAFT

(71) Applicant: AIRBUS HELICOPTERS DEUTSCHLAND GMBH, Donauworth (DE)

(72) Inventor: Axel Fink, Donauworth (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 101 days.

(21) Appl. No.: 14/578,653

(22) Filed: Dec. 22, 2014

(65) Prior Publication Data
US 2015/0183505 A1 Jul. 2, 2015

(30) Foreign Application Priority Data
Dec. 30, 2013 (EP) .................... 13400042

(51) Int. Cl.
*B64C 1/18* (2006.01)
*B64C 1/12* (2006.01)
*B64C 27/04* (2006.01)
*B64C 1/06* (2006.01)

(52) U.S. Cl.
CPC .............. *B64C 1/18* (2013.01); *B64C 1/062* (2013.01); *B64C 1/064* (2013.01); *B64C 1/12* (2013.01); *B64C 27/04* (2013.01)

(58) Field of Classification Search
CPC .. B64C 1/18; B64C 1/12; B64C 1/064; B64C 1/062; B64C 1/061; B64C 27/04
See application file for complete search history.

(56) References Cited

U.S. PATENT DOCUMENTS

| | | | | |
|---|---|---|---|---|
| 4,531,695 A | * | 7/1985 | Swinfield | ............... B64C 1/068 244/119 |
| 4,593,870 A | * | 6/1986 | Cronkhite | ............... B64C 1/062 244/119 |
| 5,069,318 A | | 12/1991 | Kulesha et al. | |
| 5,562,264 A | * | 10/1996 | Bietenhader | ............... B64C 1/00 244/117 R |
| 6,427,945 B1 | | 8/2002 | Bansemir | |
| 8,079,549 B2 | * | 12/2011 | Gouvea | ...................... B64C 1/12 244/119 |
| 8,485,415 B2 | * | 7/2013 | Kato | ......................... B64C 1/12 156/73.5 |
| 8,490,921 B2 | * | 7/2013 | Laue | ........................ B64C 1/12 244/119 |

(Continued)

OTHER PUBLICATIONS

European Search Report for EP 13400042, Completed by the European Patent Office on Jun. 2, 2014, 3 Pages.

(Continued)

*Primary Examiner* — Richard R Green
(74) *Attorney, Agent, or Firm* — Brooks Kushman P.C.

(57) ABSTRACT

The invention relates to a subfloor structure with an integral hull, for a rotary wing aircraft. The subfloor structure comprises an integral subfloor hull that defines in one piece, upward web portions acting as longerons and a bottom central portion offering both load bearing capabilities and aerodynamical loft features. The subfloor structure is useful for rotary wing aircrafts such as helicopters, and is e.g. made of composite and/or light alloy such as aluminum.

20 Claims, 4 Drawing Sheets

(56) References Cited

U.S. PATENT DOCUMENTS

| | | | |
|---|---|---|---|
| 8,695,922 B2 * | 4/2014 | Schroeer | B64C 1/061 244/117 R |
| 8,869,673 B2 * | 10/2014 | Townsend | B64C 1/20 89/36.01 |
| 8,894,010 B2 * | 11/2014 | Delahaye | B64C 1/061 244/119 |
| 2005/0001093 A1 | 1/2005 | Hayashi | |
| 2006/0165955 A1 | 7/2006 | Ruegg et al. | |
| 2007/0114331 A1 | 5/2007 | Poggi | |
| 2012/0112004 A1 | 5/2012 | Tanaka et al. | |

OTHER PUBLICATIONS

Coppinger., Flight International Apr. 26, 2005, vol. 167, No. 4982, p. 26, XP-001227208, "Composites Soften Impact."
Korean Office Action for corresponding Application No. 10-2014-0188704, mailed Jul. 21, 2016, 5 pages.

* cited by examiner

SUBFLOOR STRUCTURE WITH AN INTEGRAL HULL FOR A ROTARY WING AIRCRAFT

CROSS REFERENCE TO RELATED APPLICATION

This application claims priority to European patent application EP 13 400042.1 filed on Dec. 30, 2013, the disclosure of which is incorporated in its entirety by reference herein.

BACKGROUND OF THE INVENTION (1) Field of the Invention

The invention belongs to the overall technical class of aeronautics, and air transport.

More precisely, the invention concerns the domain of aircraft structures. Among such aircraft structures, the invention relates to the technical field of constructional features of aircraft structures, such as frames, stringers, longerons, bulkheads, but also outer shells, fairings, covers or fuselage sections.

Specifically, the invention proposes a subfloor structure for a rotary wing aircraft or rotorcraft, such as a helicopter.

(2) Description of Related Art

Before discussing the background of the invention, some terms are briefly defined.

As per FIG. 1, a rotary wing aircraft 1 comprises an airframe 2, i.e. an aircraft structure that defines an outer loft 5, i.e. the aerodynamic envelope of the fuselage. The airframe 2 is extended longitudinally and laterally aside an anteroposterior plane XZ of the aircraft 1. Such an aircraft 1 is having structural constructions, including a subfloor structure 3 at a lower part LP of the airframe 2. A rotary wing aircraft 1 also have one—or a plurality of—: rotors R, landing gear LG, and equipment.

Now referring to FIG. 2, is discussed a typical background of the invention.

In a classical rotary wing aircraft 1, a subfloor structure 3 is arranged within the lower part LP, between a floor surface 4 defining a cabin level and the outer loft 5. Typically, the subfloor structure 3 comprises a bottom shell 16, outer floor panels 13, inner floor panels 14 and a framework construction 15. The framework construction 15 connects the floor panels 13-14 to the bottom shell 16. For typical aircrafts, the bottom shell 16 covers most of the surface of the lower part LP of the outer loft 5, below the floor surface 4. The framework construction 15 comprises interconnected longerons 8, outer ribs 9 and inner ribs 10, as well as the lower portion of main frames 11.

The longerons 8 are structural and generally longitudinal beams being basically arranged side by side along the anteroposterior plane XZ. The longerons 8 are spanning the entire length of the subfloor structure 3, whereas the outer ribs 9 and inner ribs 10 are forming crossbeams.

Such crossbeams are basically arranged orthogonally to the anteroposterior plane XZ and span the whole width of the subfloor structure 3 at their respective location. Hence, the framework construction 15 adopts a somehow perpendicular grid configuration with numerous intersections, such as the discrete kink locations 12.

Upwardly, both the longerons 8 and the ribs 9-10 extend from the bottom shell 16 to the floor surface 4 and feature basically flat stiffened webs. Each longeron 8 or rib 9-10 has respective caps, along the upper and lower perimeter of the corresponding flat stiffened web.

Typical in such architectures, a fore portion of the longerons 8, proximal to the nose of the subfloor structure 3, is tilted inwardly with respect to a longitudinal direction X of the aircraft 1, in order to adapt the construction framework 15 to the outer loft 5 that shows a smaller width close to the front (nose) of the aircraft 1. The longerons 8 are locally attached to respective ribs 9-10 at the discrete kink locations 12, where the aft portion of the longeron 8 is substantially in line with the longitudinal direction X.

The fore portion of the longerons 8 is also upwardly slanted by a predetermined angle in the anteroposterior plane XZ, with respect to the longitudinal direction X. The caps being connected to the rib at the discrete kink locations 12, this provides for adequate support of the caps of the longerons 8, reacting the discrete deflection of the normal loads of the caps of the longerons 8. Geometrically speaking, the longerons 8 show a longitudinal trace progression described by two straight lines with no tangential continuity at their connection point.

At side portions of the bottom shell 16, it is typical having access openings 6, providing access to the systems/equipment integrated in the space between the longerons 8 and these side portions. The side portions and an essentially flat lower portion of the bottom shell 16 are forming a single part in some known airframes 2. In other known airframes 2, the side portions of the bottom shell 16 are individual parts attached to the lower portion. Known airframes 2 have a bottom shell 16 made from composites. Such bottom shell 16 typically features a sandwich design with monolithic regions all along the joints connecting the construction framework 16 to the bottom shell 16.

The tasks of the subfloor structure 3 are manifold. A typical subfloor structure 3 takes on the one hand the payload efforts and the loads from the landing gear LG. Such a subfloor structure 3 also transmits these efforts and loads to the main frames 11 globally acting, for specific types of architectures, as a beam supported by the two main frames 11.

On the other hand, most known subfloor structures 3 house various systems/equipment (e.g. electrical, mechanical and armoring). Typically, in known subfloor structures 3 housing of systems/equipment is mostly located in lateral volumes enclosed laterally between the longerons 8 and the side portions of the bottom shell 16. Close to the center of the bottom shell 16, on sides of the anteroposterior plane XZ, the longerons 8 confine, together with corresponding crossbeams formed by the ribs 9-10, compartments for fuel tanks T. In such compartments, elastomeric bladders are installed.

Known subfloor structures 3 further provide for substantial kinetic energy absorption in case of a crash scenario of the rotary wing aircraft 1. The longerons 8 are beams working as main load carrying members.

So as to illustrate the prior art, citation is now made of published documents related to constructional features of aircraft structures. For disclosure statement, the documents are US2007/0114331, US2005/0001093 and U.S. Pat. No. 6,427,945.

The document US2007/0114331 describes a helicopter collapsible deck having at least one longitudinal member and at least one cross member, which extend respectively in a first and second direction intersecting at a point; the cross member is interrupted at the point of intersection. The deck also has an anchoring device for connecting the longitudinal member and the cross member at the point of intersection. The anchoring device has at least one local permanent deformation section lying in a plane crosswise to the deck and for dissipating the energy transmitted to the deck in the event of impact.

The document US2005/0001093 describes an impact resistant structure of a helicopter, which includes: an energy absorber positioned under a floor of the helicopter and directly connected to a cabin frame of the helicopter. The energy absorber is arranged in accordance with a distribution of a ground reaction force on a general ground at a time of crash situation. Another aspect provides an energy absorber that includes: a plurality of independent hollow tubes of fiber reinforced composite material integrally formed by bundling only the hollow tubes. The hollow tubes are arranged so as to reduce a number of intersecting wall surfaces of the hollow tubes.

The document U.S. Pat. No. 6,427,945 describes a subfloor structure of an aircraft airframe of a helicopter that includes longerons and crossbeams that intersect each other and are interconnected to form a grid that is fixedly attached to the floor and the bottom skin of the aircraft fuselage. Structural elements such as pyramid frustums and reinforcements are arranged on the beams. The longeron and the crossbeam have a trapezoidal cross-section open on the wider base side, closed by a spine web along the narrow side, and bounded laterally by inclined leg webs that extend downwardly from the spine web at an angle outwardly relative to each other. The subfloor structure grid effectively absorbs the energy of a crash impact having both axial or vertical as well as non-axial or lateral impact force components.

The document US2012/0112004 describes a shock absorbing structure for a helicopter. The shock absorbing structure is miniaturized by providing a beam-like member having a recess and a shock absorbing member. One end of the shock absorbing member is arranged in the inside of the recess and the other end of the shock absorbing member is arranged outside of the recess. The area of the recess overlaps the place where the structure member supports the structure even at a dead-stroke in which the shock absorbing member is bottomed out.

The document "Composites soften impact" (in Structures by Rob Coppinger, page 26, London, 2005), referenced as XP001227208, describes composites soften impact in helicopter structures. In a subfloor, cones for energy absorption are tailored in terms of stiffness and strength, while skin beam joints are specially designed together with a toughened energy absorbing skin. From the single Figure, classical longerons are provided, as usual in many helicopter structures.

Although the prior art provides interesting techniques, technical problems remain unsolved and useful enhancements would be beneficial.

In a few words, enhancing the efficiency of a rotorcraft subfloor structure in terms of structural weight, design complexity, assembly work, manufacturing and overall production costs is becoming more and more required. This is due e.g. to the increasing cruising speed available with modern rotorcraft, the upgrade of customer needs in terms of payload/passengers capacity, the expending demand for lighter/cleaner/safer/longer-ranged and more silent apparatuses. While these constraints are growing, the demand for more energy saving and long-lasting rotorcrafts also increases, in an antagonistic manner.

Besides, some other relative drawbacks may derive from prior art, as exemplified hereafter.

Both, the longerons and the bottom shell are frequently load carrying. A load proof connection between the lower longeron caps and the bottom shell is required. This connection is highly loaded in the fuel tank area due to the peeling load excited by the fuel inertia transverse pressure load. This load proof connection requires a high reliability and strength, high accuracy during the assembly process, high damage tolerance and adequate reparability. This load proof connection is hence defined by additional structural joints and the associated increase in structural complexity and production efforts in terms of e.g. tolerance management, quality assurance, assembly, sealing and production time. This finally translates to higher structural weight and production costs.

The discrete deflection of the load of the longerons at the intersectional kink locations results in high local stress levels at the upper caps of the longerons in the connection area. The upper caps have then to be supported by the rib by means of additional brackets. This is hence increasing weight and structural complexity.

Due to the numerous cut-outs at the lateral sides of the fairings in the lower shells, most integral shell designs with integrated side shells becomes quite ineffective in terms of mechanical performance and manufacturing costs. In this case, an additional secondary element—the side shell portions with cut-outs—is integrated to a primary element—the bottom shell portion. Meanwhile a primary element—the longerons—is attached to another primary element—the bottom shell portion—by means of a highly loaded structural connection. Facing the outstanding possibilities of composites materials allowing for high structural integrability, this technical solution is deemed ineffective in terms of weight and reliability. The most current prior art rotorcrafts having alternatively separate side shells attached to a separate lower cover shell part includes another joint in the structure hence increasing complexity, assembly and production costs.

Due to the necessity to attach the longerons to the bottom shell, the bottom shell has to provide for monolithic areas along the attachment to the construction framework. Providing for monolithic areas within a sandwich shell would reduce the bending stiffness of the sandwich bay, and would increase the production time and complicate an automatic lay-up with automatic composite fiber placement techniques.

In view of the above drawbacks, it is an aim of the invention to provide for a subfloor structure that simplifies the structural arrangement of main load bearing components, in order to improve the overall structural airframe efficiency in terms of weight and production costs. Should a composite subfloor structure be contemplated, this would take benefit of the design and manufacturing advantages of composite materials. But similar benefits may be reached with other construction methods such as forged integrated large-sized metal items, e.g. involving light alloys like aluminum alloys.

Therefore, an object of the invention is to provide a subfloor structure avoiding, among others, most of the exposed drawbacks of the prior the art.

In this purpose, based upon the teachings of the document U.S. Pat. No. 6,427,945, claimed objects are a subfloor structure and a rotary wing aircraft.

BRIEF SUMMARY OF THE INVENTION

In an embodiment, the subfloor structure for a rotary wing aircraft is comprising: an airframe extended longitudinally and laterally aside an anteroposterior plane and including and delimiting the subfloor structure with an outer bottom shell, a construction framework, and floor panels defining a floor surface at least locally perpendicular to an elevation direction of the anteroposterior plane; the subfloor structure having a pair of longerons extending at least locally along the longitudinal axis and at least a pair of crossbeams defined by inner and outer ribs and at least locally extending along a transverse direction orthogonal to the anteroposterior plane; the outer bottom shell having a bottom central portion delimited transversally by the two longerons, the outer bottom shell further having at least a pair of outer side shells extending outwards aside the bottom central portion.

The subfloor structure further comprises an integral subfloor bowl hull made of a U-shaped one-piece and defining at least: the bottom central portion, two lateral transition regions and two upward web portions; the upward web portions integrally extending from the bottom central portion by forming the two longerons and being integrated to the integral subfloor bowl hull together with the two lateral transition regions; the lateral transition regions being opposed one to the other relatively to the anteroposterior plane, each transition region being continuously merged with the bottom central portion and one of the two upward web portions; the outer side shells being attached to the integral subfloor bowl hull in the vicinity of the lateral transition regions.

In an embodiment, the integral subfloor bowl hull is having at least a pair of upper external extensions each laterally extending from the upward web portions at least locally in a plane parallel to the floor surface, each of the upward web portions having a transitional location rigidly attached to the corresponding upper external extension, each transitional location being located proximal a top end portion of the corresponding upward web portion.

In an embodiment, at least a pair of upper external extensions is formed integral with the subfloor bowl shell at the transitional locations, each corresponding upward web portion being attached to the corresponding upper external extension in a continuous merging into the adjacent horizontal extension at the corresponding transitional location by forming a continuous curved transition. Thus, the invention allows the outer floor panels to be obtained together with the subfloor bowl hull.

In an embodiment, at least two upper external extensions are initially constructed as separated parts; each upper external extension is attached at a corresponding upper transitional location at a top end of the corresponding upward web portion of the integral subfloor bowl hull, by mechanical fastening means. Thus, the invention allows some outer floor panels to be replaced by the upper external extensions and to be easily jointed to the subfloor bowl hull.

In an embodiment, each upward web portion extends upwardly from the bottom central portion of the subfloor bowl hull to a transitional location located proximal a top end portion of the upward web portion; the upward web portion extends at least locally parallel to the anteroposterior plane and the transitional location is extending atop the upward web portion, below the floor surface.

In an embodiment, the integral subfloor bowl hull spans over at least ⅔ of an overall longitudinal dimension of the subfloor structure, below the floor surface. The one-pieced structure allows the invention to provide a highly integrated architecture, without major disruptions along the longitudinal direction, thus offering remarkable mechanical performance and reduced assembling work-load.

In an embodiment, the subfloor structure incorporates a lower portion of at least two main frames; the main frames are attached to the integral subfloor bowl hull by mechanical fastening means.

In an embodiment, the integral subfloor bowl hull is a single-piece made of a composite material; the subfloor bowl hull having the bottom central portion and the integrated upward web portions constructed in a one shot curing step. The one-pieced structure allows the invention to provide a highly integrated architecture, possibly further integrating the upward web portion in a single composite unit.

In an embodiment, the integral subfloor bowl hull is made from a single-pieced of metal. The one-pieced structure allows the invention to provide a highly integrated architecture, possibly further integrating the upward web portion in a single metal-made unit, e.g. by forging.

In an embodiment, the subfloor structure is having the horizontal extensions; the outer ribs forming crossbeams are attached to the subfloor bowl hull at an outer portion of the upward web portions and at a lower portion of the horizontal extensions, by mechanical fastening means. The invention thus allows offering remarkable mechanical performance and reduced assembling work-load for outer ribs of crossbeams.

In an embodiment, the subfloor structure is having at least two upper external extensions above corresponding lateral transitional locations, each outer side shell being attached to the subfloor bowl hull in the vicinity of an outer portion of the lateral transitional location, to at least one outer rib forming a crossbeam and to a lower portion of the corresponding upper external extension, by mechanical fastening means. The invention thus allows offering remarkable mechanical performance and reduced assembling work-load for outer side shells.

In an embodiment, at least one inner rib of a crossbeam is attached to an inner portion of the corresponding upward web portion and to an upper portion of the bottom central portion of the integral subfloor bowl hull, by mechanical fastening means. The invention thus allows offering remarkable mechanical performance and reduced assembling work-load for inner ribs of crossbeams.

In an embodiment, the subfloor structure is having two upper external extensions flush with the floor plane; at least an inner floor panel being attached to an upper portion of the subfloor bowl hull, by mechanical fastening means; the two upper external extensions forming at least a part of outer floor panels. Thus, the invention allows easy obtaining of the floor surface, by easy adding of the inner panels and integrating of the outer floor panels, to the subfloor structure.

In an embodiment, the lateral transition locate regions and the transitional locations each form a cross-sectional contour, the cross-sectional contour describing an all along, smooth and tangential continuity in a transverse plane perpendicular to a longitudinal direction of the subfloor structure. Thus, the invention avoids discrete load deflections.

Another object of the invention is a rotary wing aircraft comprising an airframe and a subfloor structure as exposed above. The subfloor structure comprises at least one integral subfloor bowl hull with integrated upward web portions. The rotary wing aircraft is chosen among: helicopters, hybrid rotorcraft, UAV drone rotorcrafts.

BRIEF DESCRIPTION OF THE SEVERAL VIEWS OF THE DRAWINGS

Non-limiting embodiments of the invention are described by way of examples, with reference to the accompanying drawings, including the following FIGS. 1-7.

The FIG. 1 is a schematic side elevational view of a rotary wing aircraft, oriented front at left side and aft at right side; the undercarriage or other structural items of the rotorcraft like the geometrical floor surface are illustrated as schematic box just for allowing an overall location.

Figure 2:
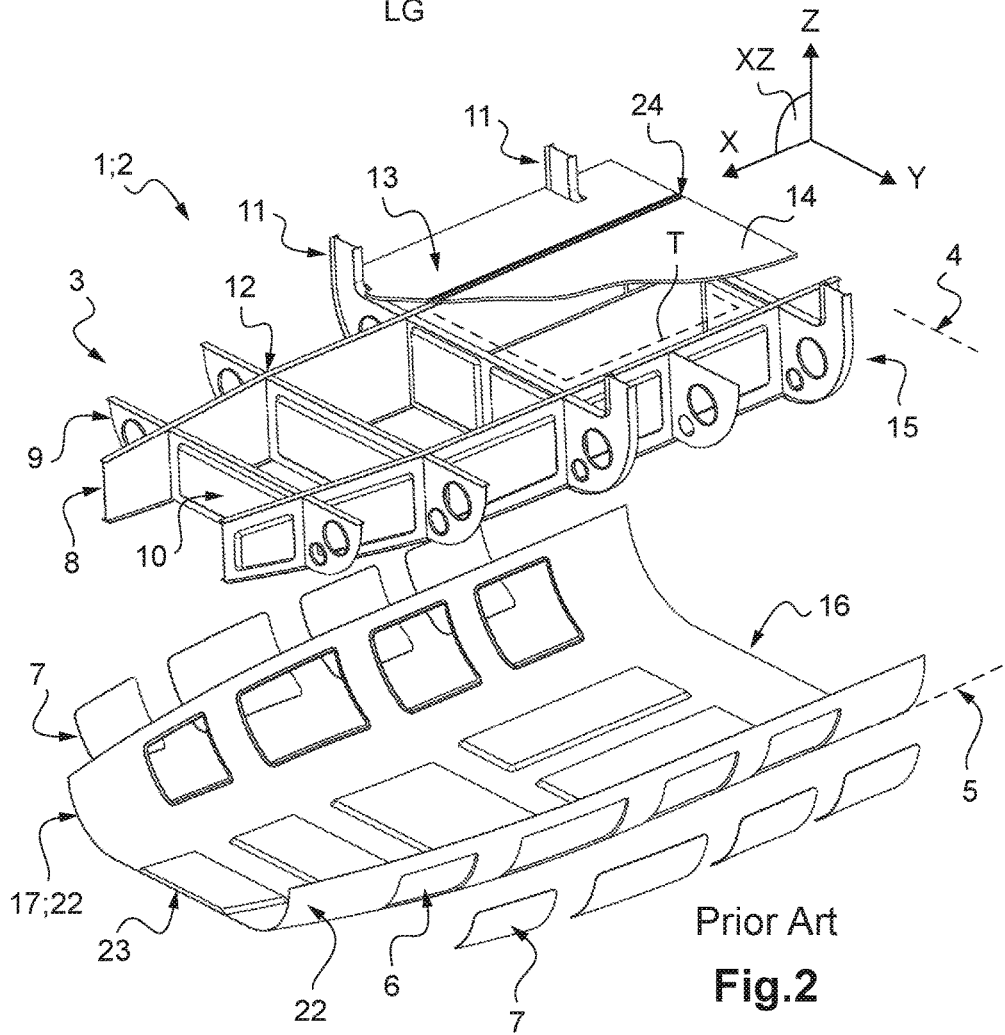

The FIG. 2 is a part perspective view, with exploded structural items, of a non claimed subfloor structure.

Figure 3:
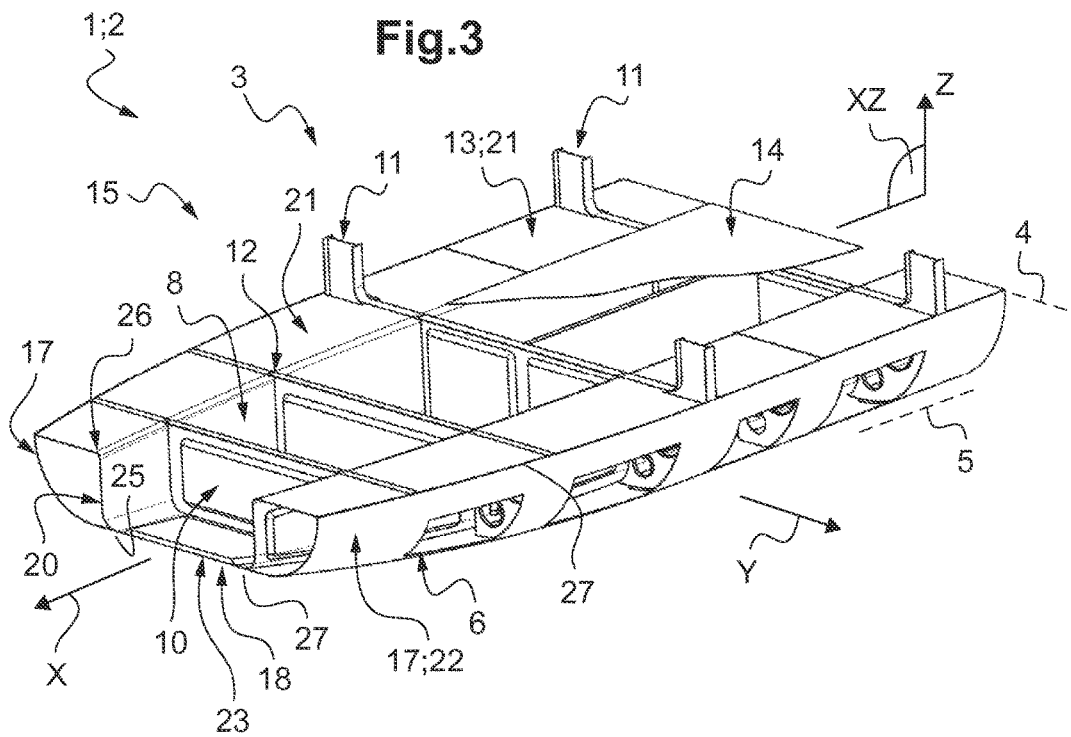

The FIG. 3 is a part perspective view, from above and oriented front at left side and aft at right side, of an embodiment of subfloor structure according to the invention, with two integrated upward web portions and two appending upper external extensions integrated into a single integral subfloor bowl hull. The outer side portion is attached to the integral hull by mechanical fastening means.

Figure 4:
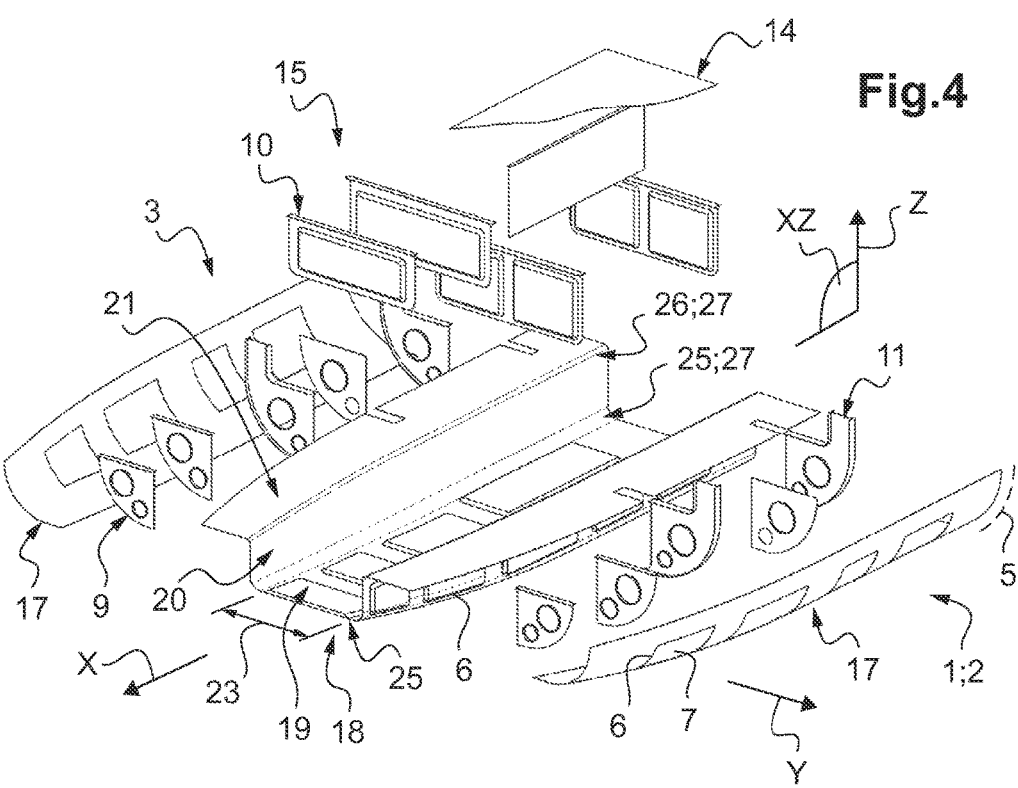

The FIG. 4 is a part perspective view, with exploded structural items, of an embodiment of subfloor structure according to the invention, with two integrated upward web portions and oriented front at left side and aft at right side.

Figure 5:
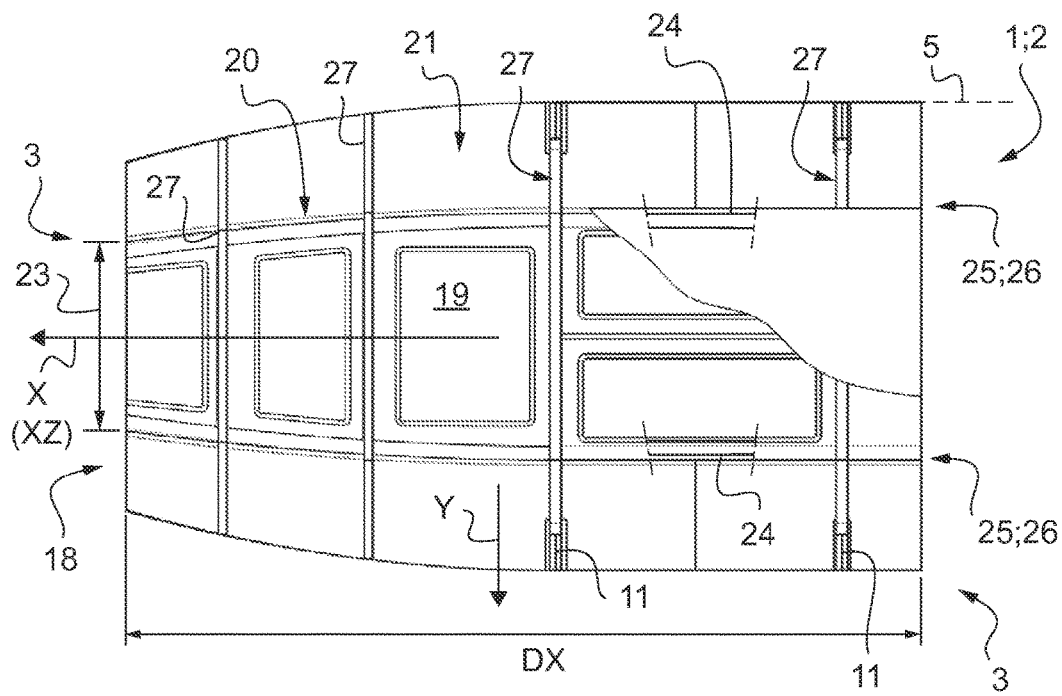

The FIG. 5 is an upright part plan view from the above, showing an embodiment of a subfloor structure to the invention, with two integrated upward web portions and oriented front at left side and aft at right side. The FIG. 5 shows the overall longitudinal dimension of the subfloor structure.

Figure 6:
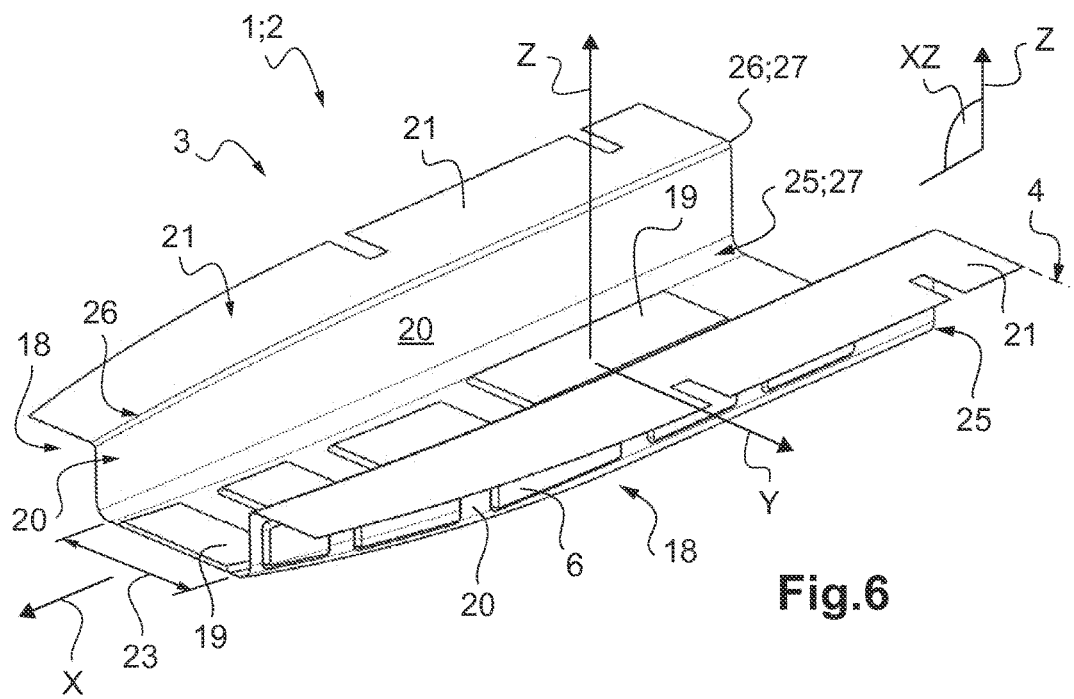

The FIG. 6 is a perspective view, of an embodiment of an embodiment of single integral subfloor bowl hull for a subfloor structure according to the invention, forming a singled-piece of composite material with two integrated upward web portions and upward web portions, showed oriented front at left side and aft at right side.

Figure 7:
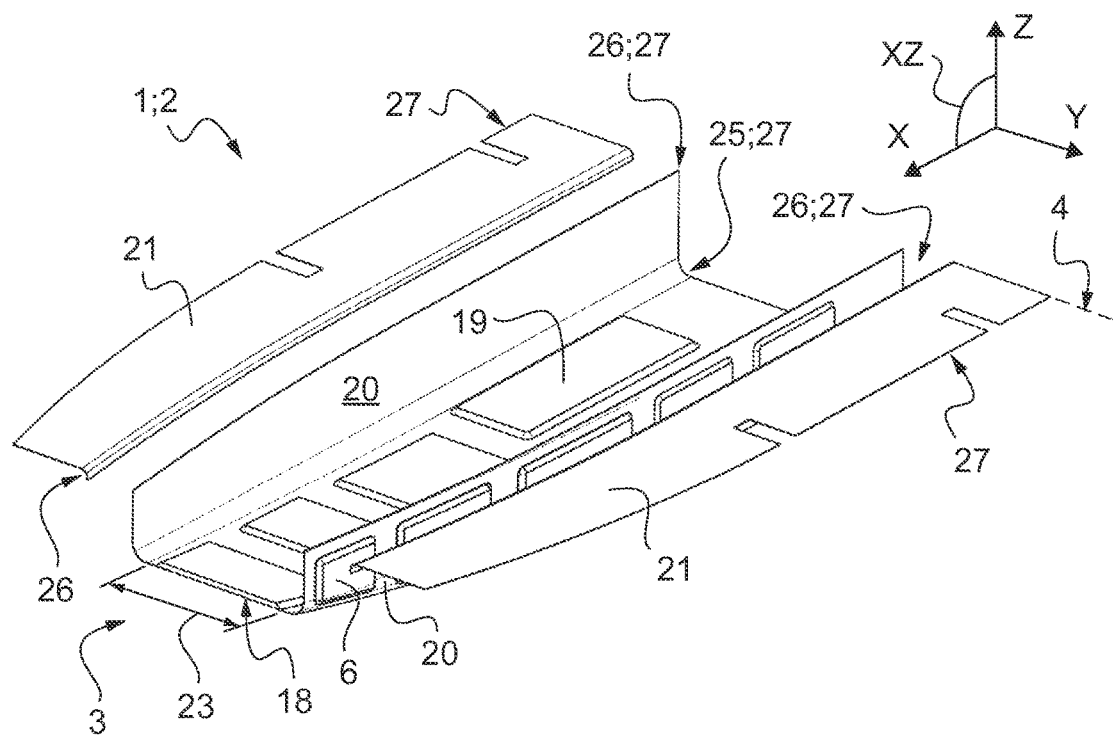

The FIG. 7 is a part perspective view, from above and oriented front at left side and aft at right side, of another embodiment of subfloor structure according to the invention, with two appending upper external extensions mechanically attached a posteriori to the construction of an integral subfloor bowl hull made as a single-pieced of light metal alloy or composite.

DETAILED DESCRIPTION OF THE INVENTION

In the following, throughout the figures equal features and objects as well as parts are referred to the same numerals.

In examples, for defining in the invention 3D, three mutually orthogonal directions X, Y and Z, also called "axis", are depicted in FIGS. 2-9. A first direction X, referred to as "longitudinal" direction, to which reference is made as of the front/back locating of the structures described. Typically, in an aircraft, this corresponds to the roll axis. Terms such as front/rear are relative thereto. Another direction Y is referred to as being "transverse", and is referred to as of the side or lateral locating of the structures described. The terms "side" or "left"/"right" are relative thereto.

Typically, in an aircraft, this corresponds to the pitch axis. Yet another direction Z, referred to as being "height", to which reference is made as of the elevation or upright dimension of the structures described. Typically, in an aircraft, this corresponds to the yaw axis. Terms such as "up"/"down" or "high"/"low" are relative thereto. The directions X, Y and Z define together a referential "XYZ". The directions X and Z define together an anteroposterior plane XZ of the aircraft 1.

Figure 1:
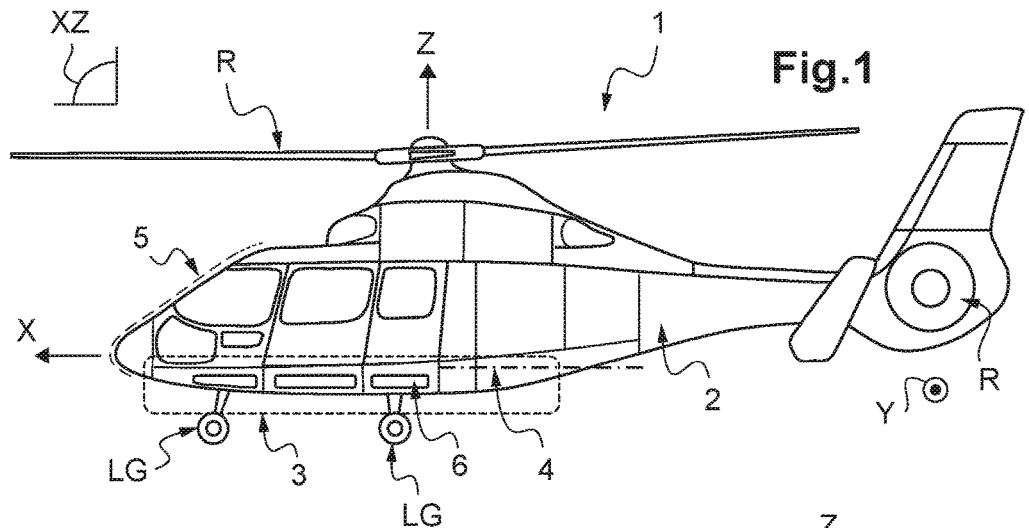

The FIG. 1 shows in a schematic view a rotary wing aircraft 1 comprising an airframe 2 and a subfloor structure 3. The subfloor structure 3 is arranged between a floor surface 4 and an outer loft 5 of the airframe 2 of the rotary wing aircraft 1 below the floor surface 4. The invention is e.g. dedicated to aircrafts 1 like the one of FIG. 1.

In classical rotorcrafts, e.g. like in FIG. 3, the subfloor structure 3 comprises a bottom shell 16 and a framework 15, wherein the construction framework 15 is arranged inside the bottom shell 16.

The FIG. 3 shows that the framework 15 and the bottom shell 16 are denoted as separate parts of the subfloor structure 3. The access openings 6 and the opening covers 7 are shown explicitly. It can be seen, that the bottom shell 16 is a single part consisting of the substantially flat central bottom portion 23 and the two side curved portions 22 with the access openings 6. The bottom shell 16 comprises a sandwich design with monolithic regions all along the joining areas to its attachment to the framework 15. The framework 15 fits into the bottom shell 16, wherein the outer panels 13 and the inner panels 14 cover the framework 15, wherein the mainframes 11 protrude beyond the floor surface in a vertical direction.

In the following, the terms and expressions as at least locally extending have to be understood in a broad manner. The general extending indicates an overall direction along which the item is extending, but of course do comprises embodiments where items of the subfloor structure 3 are locally bent or diverging from a pure longitudinal/transverse/elevational direction.

From the invention embodiments, the structures corresponding to longerons 8 are shown as substantially so-called vertical webs 20 having similar function than the separated and further added longerons 8. A subfloor bowl hull 18 comprises thereby the substantially flat portion of the bottom shell 16 and the substantially vertical webs 20, both primary load carrying parts. Two substantially vertical webs 20 are foreseen, one at each side of the flat portion of the bottom shell 16. The substantially vertical webs, called upward web portions 20, are starting to extend in a substantially perpendicular direction from the lower part of the bottom shell 16, towards a floor surface 4 with floor panels (13, 14/21) of the aircraft 1.

The angle between the substantially flat portion of the bottom shell and the substantially vertical webs and the floor surface can be between 80° and 130°. The so-called vertical webs 20 are e.g. integrally formed on both longitudinally extending sides of the bottom shell 16, in particular from both sides of the substantially flat and horizontally extending portion of the bottom shell 16. Thereby the bottom shell 16 and the vertical webs 20 can span the main longitudinal extending portion of the subfloor structure. The substantially vertical webs can take over hereby the functionality of the longerons in the subfloor structure 3.

Between the substantially vertical webs and the bottom shell a material and structural continuity can be advantageously realized. The load carrying parts of the subfloor structure 3 can thereby be improved by avoiding stress concentration. Possible sources of failure can thereby be eliminated. A lower edge radius between the transition from the substantially flat bottom shell 16 and the substantially vertical webs of the upward web portions 20 can act as a trigger function within the vertical portion of the subfloor bowl hull 18 during a crash and can be varied.

In a top view of a classical subfloor structure 3, the longitudinal discrete kinks locations 12 are shown, wherein the trajectory of the respective longerons 8 is tilted inwards in order to adapt the framework 15 to the outer aircraft loft 5. An inner rib 10 is arranged coincident to the discrete kink location 12 to provide for adequate support and to react the discrete deflection of the load path of the longeron 8.

The FIG. 3 shows a subfloor structure 3 according to the invention that comprises a "hat-shaped" subfloor bowl hull 18, inner ribs 10 and outer ribs 9 for crossbeams, and two outer side shells 17 with access openings 6. The subfloor bowl hull 18 comprises a bottom central portion 23, upward webs portions 20, and integrated upper external extensions 21. The subfloor bowl shell 18 is one single integral part, with the bottom central portion 23, the webs 20 and the extensions 21 being integrally formed. The outer side portions 17 are shells close the contour of the hull 18, at its sides.

The outer side portions 17 are secondary structural elements which are attached to the subfloor bowl hull 18 at a lateral transition area (transition region 25) from the bottom central portion 23 with the webs 20, to the outer lateral borders of the extensions 21 and to the outer ribs 9. The rigid attachment of the various structural items (e.g. 9, 10, 11, 17, and 21) to the hull 18 are designated as mechanical fastening means and shown in 27 on the FIGS. 3 and 5. The inner ribs 10 are arranged inside the subfloor bowl hull 18 between the webs 20, and are attached to the webs 20 and to the bottom central portion 23. The bottom central portion 23 of the hull 18 shows a flat lateral extension and a slight outwardly convex curvature along the longitudinal direction X, from the front to the back of the aircraft 1.

The extensions 21 comprise cut-outs to house the main frames 11.

An inner floor panel 14 is attached on top of the inner ribs 10, the lateral outer borders being attached to the webs 20 by mechanical fastening means 27.

In a further embodiment (shown on FIG. 7), each extension 21 is formed as a separate part that is connected to U-shaped subfloor bowl hull 18 comprising the bottom central portion 23 and the webs 20. The extensions 21 of this embodiment are attached in this embodiment, to the top end of the respective webs 20, by mechanical fastening means 27.

The FIG. 4 shows the subfloor bowl hull 18 that comprises the bottom central portion 23, the webs 20 and the extensions 21. The geometrical continuity of these three structural items of the bowl hull 18 is resulting from integration into a single, unitary piece (i.e. the hull 18). The continuous transition at the transition region 25 between the bottom central portion 23 and the webs 20, and the continuous transition at transitional locations 26 between the webs 20 and the extensions 21 show a radius corner. From FIG. 5, is shown that the hull 18 is continuous along the most part of an overall longitudinal dimension DX of the whole subfloor structure 3, in the longitudinal direction X and shows a sandwich design with monolithic regions all along the joining areas to the crossbeams and sandwich regions 19. Unlike FIG. 2, no discrete kink location 12 is present along the trajectory of the webs 20. The main frames 11 are divided into central portions, which are allocated within the webs 20, and lateral portions which are allocated between the outer side portions 17 forming shells, and the webs 20.

The FIG. 5 shows that the trajectory of the webs 20 follows a smoothly curved shape, with no kinks. The trajectory of the webs 20 is denoted by the transitional locations 26 between the respective web 20 and the respective extension 21 or the top end of the web 20. The smooth curve shows a tangent continuity all along its length.

The FIG. 6 shows the subfloor bowl hull 18 of FIG. 4. The subfloor bowl hull 18 represents the core element of the subfloor structure 3. The hat-shaped (or reversed omega sign shape) integral design of the subfloor bowl hull 18 is denoting the bottom central portion 23, the webs 20 and the extensions 21 being all formed in one single piece. The subfloor bowl hull 18 comprises only primary structural elements, which are main load carrying parts. The lateral borders of the bottom central portion 23 merge into the webs 20 forming a continuous and smooth transition region 25 with a radius corner. The top borders of the webs 20 merge into the extensions 21 forming a continuous and smooth transitional location 26 with a radius corner. The subfloor bowl hull 18 is in the embodiment of FIG. 4, made of a composite material and cured in one single shot. The sandwiched areas 19, the monolithic areas and the cut-outs of the horizontal extensions of the hull 18 are shown on FIGS. 4 and 6.

The FIG. 7 shows an embodiment of the integral subfloor bowl hull 18, being composed of a bottom central portion 23 and two upwards web portions 20, the lateral borders of the bottom central portion 23 merging into the corresponding webs 20 forming a continuously smooth lateral transitional location with a radius corner. Unlike on FIGS. 4-6, the upper external portions 21 are separate parts, attached a posteriori to the upper borders of the webs 20. Mechanical fastening means 27 are making the integrated hull 18 and the upper external portions 21 rigidly attached together.

In the embodiment of FIG. 7, the integral hull 18 is a single-pieced of composite. In other embodiments, the hull 18 of FIG. 7 is made of forged metal alloy, for instance of aluminum alloy e.g. obtained by forge working of a sheet of light metal alloy.

In the subfloor structure 3 of FIG. 7, the pair of upper external portions 21 is thus initially constructed as separated parts. Then, each upper external portion 21 is attached at a corresponding upper connection area, i.e. another type of transitional location 26, to the upward web portions 20 of the subfloor bowl hull 18, by mechanical fastening means 27. This departs from the embodiments of FIGS. 3-6 where the upper external portions 21 are integral with the upward web portions 20 and therefore the whole subfloor bowl shell 18.

The subfloor structure 3 of the invention comprises attachments for embarked payload, e.g. rail seats 24.

Here are mentioned some of the principles of the invention.

The integration of a secondary element (secondary element=not main load carrying element) to a primary element is less effective than the integration—e.g. in a subfloor bowl hull 18—of a primary element (primary element=main load carrying element, e.g. web portions 20 acting like longerons 8, part of bottom shell 16 defined by the bottom central portion 23 and in embodiments the upper external extensions 21) to another primary element, since a main structural joint and all of the associated drawbacks and challenges are then eliminated. Doing so, the structural reliability, robustness and weight efficiency are increased.

Secondary elements (e.g. outer ribs 9, inner ribs 10, main frames 11 and in embodiments the upper external extensions 21) can be then attached by secondary joints (less strength and reliability required) to the primary integral element. The invention thus allows the longerons (primary elements) being integrated to the lower portion of the bottom shell 16 (primary element) resulting in an integral "bowl"-like structural element (the hull 18) which represents the main load carrying part within the subfloor structure 3. This design eliminates a primary attachment between the longerons 8 and the bottom central portion 23 of the shell.

With the invention, the secondary side shells (secondary elements e.g. outer side portions 17) of the bottom shell 16 can be designed as individual parts which are rigidly attached to the "bowl" element (hull 18) at its lower portion

(23) by means of chemical bonding and/or physical fastening (the expression "mechanical fastening means 27" covers all these types of rigid attachment). For instance, means 27 includes: screwing, riveting, gluing, welding or the like. Since the outer side portions 17 are secondary elements, there are no strong requirements set on their attachment to the hull 18. This departs the invention from prior bottom shells that include in a single hull 18, both the bottom central portion 23 and the outer side portions 17.

The integral subfloor bowl hull 18 of the invention shows in a first embodiment a substantially horizontal, flat bottom portion 23—that corresponds to the lower shell portion of the subfloor structures of the art—and two substantially vertical webs 20—that correspond to the longerons 8 of the art—extending from both lateral ends of the horizontal bottom shell portion. There is a material and structural continuity between the load carrying bottom shell portion and the webs hence eliminating stress concentrations and possible sources of failure.

The lower edge radius at the transition from the lower shell portion and the vertical shell portions develops the trigger function within the vertical shell portions during a cash event. The upper longeron has upper caps which are integrated within the upward web portions 20 and lower caps are integrated to the bottom central portion 23 or its transition area to the webs 20. In this configuration, the floor surface 4 shows a central portion (panel 14) and lateral portion (panels 13) which are attached to the webs of the hull 18, the ribs, frames and the side shells. In embodiments, the lateral floor parts (panels 13) are fixed structural parts, whereas the central floor part (panel 14) is removable.

In an embodiment of the invention, the "bowl"-shell formed by the integral subfloor bowl hull 18 incorporates as well substantially horizontal elements (upper external extensions 21), extending outwards from the upper ends of both substantially vertical webs. These parts are structural components that continuously stabilize the webs and the upper caps of the integral longeron defined by the portions 20, allowing for a smooth, continuous and smeared deflection of the loads applied on the cap.

The substantially horizontal portions 21/extensions 21 are hence primary load bearing elements which increase at the same time the effective area moment of inertia and hence the bending stiffness of the subfloor structure 3. The substantially horizontal extensions are preferably at the same time the outer floor panels. In an embodiment, a central, removable inner floor panel 14 is then mechanically attached by means 27, to the webs of the "bowl"-shell and to the ribs.

A discrete deflection of the longeron's load of the art is eliminated, where contrary to the design as per the invention, stress concentrations do arise at one single discrete kink location 12.

Geometrically speaking, the webs of the "bowl"-shell or hull 18 show a longitudinal trace progression described by a curve with tangential continuity all along their top ends (or, if having upper external extensions 21 at their upper ends, along the transition from the webs to the extensions).

The main functions of load carrying in the subfloor structure 3 are allocated within one single part, the hull 18. This is useful, easy to obtain during manufacturing processes and effective using composite materials and leads to important structural simplifications as well as to a pronounced compatibility to specific composite-related manufacturing processes.

Further parts like supporting outer ribs, inner ribs and main frames are attached to the webs and bottom part of the integral subfloor bowl hull 18 or "bowl"-shell.

Here are mentioned some advantages of the invention.

Two primary, main load-carrying elements of the art—the longerons 8 and the bottom central portion 23 of the bottom shell 16—are integrated within a single part (hull 18). This eliminates the need of structural, primary joints between them.

This translates to a better performance and improved reliability, robustness and weight efficiency, since there is no additional source of failure (joints are structural discontinuities which excite interruptions of the load path and hence stress intensities which can initiate structural failure) and no additional need of inspection and assembly.

The invention eliminates a localized intersectional kinks and the associated discrete deflection of the load path of the longerons which are integrated in webs 20 according to the invention, hence eliminating the associated stress intensities and the required additional fittings.

Load bearing horizontal extensions increase the bending stiffness of the subfloor structure 3.

Embodiments of the invention allow exploiting the advantages of composite materials, allowing a higher degree of structural integration and the production of non-developable surfaces.

Integrating outer side extensions 21 (acting as external outer floor panels 13 of the art) to the integral subfloor bowl hull 18 in the floor surface 4, as per embodiment of FIGS. 4-6, eliminates another structural joint (that one needed to attach the lateral floor panels to the "bowl"-shell webs), hence leading to further structural advantages.

Now, for clarity purposes, is a listing of alphanumeric references of various items shown in the Figures.

TABLE 1

Reference List

| REFERENCE | DESIGNATION |
|---|---|
| X | Longitudinal Axis |
| Y | Transverse Axis |
| Z | Elevation Axis |
| XZ | Anteposterior Plane |
| LG | Landing gear |
| R | Rotors |
| LP | Lower part of airframe |
| T | Fuel tanks |
| DX | Overall longitudinal dimension (3) |
| 1 | Rotary wing aircraft |
| 2 | Airframe |
| 3 | Subfloor structure |
| 4 | Floor surface |
| 5 | Outer loft (Aerodynamic envelope) |
| 6 | Access opening |
| 7 | Removable Cover |
| 8 | Longeron |
| 9 | Outer rib of crossbeam |
| 10 | Inner rib of crossbeam |
| 11 | Main Frame |
| 12 | Discrete kink locations |
| 13 | Outer floor panel |
| 14 | Inner floor panel |
| 15 | Framework construction |
| 16 | Bottom shell |
| 17 | Outer side portion |
| 18 | Integral subfloor bowl hull |
| 19 | Sandwich region |
| 20 | Upward web portions |
| 21 | Upper external extensions |
| 22 | Side curved portion |

TABLE 1-continued

Reference List

| REFERENCE | DESIGNATION |
|---|---|
| 23 | Bottom central portion |
| 24 | Seat Rails |
| 25 | Transition region |
| 26 | Transitional locations |
| 27 | Mechanical fastening means |

What is claimed is:

1. A subfloor structure for a rotary wing aircraft having an airframe extended along an anteroposterior plane, including and delimiting the subfloor structure, the subfloor structure comprising:

an integral subfloor bowl hull made of a U-shaped one-piece having material and structural continuity and jointlessly defining at least a bottom central portion, two lateral transition regions and two upward web portions, and two upper external extensions; the upward web portions integrally extending from the bottom central portion to form two longerons for the subfloor structure extending at least locally along a longitudinal axis, the bottom central portion being delimited transversally by the two upward web portions, the two upward web portions being integrated to the integral subfloor bowl hull together with the two lateral transitional regions; the lateral transition regions being opposed one to the other relatively to the anteroposterior plane, each transition region being continuously merged with the bottom central portion and one of the two upward web portions;

at least a pair of crossbeams defined by inner and outer ribs and at least locally extending along a transverse direction orthogonal to the anteroposterior plane;

at least a pair of outer side shells extending outward aside the bottom central portion and being attached to the integral subfloor bowl hull in the vicinity of the lateral transition regions; and floor panels defining a floor surface at least locally perpendicular to an elevation direction of the anteroposterior plane;

wherein the integral subfloor bowl hull and the at least a pair of outer side shells provide an outer bottom shell for the subfloor structure;

wherein the two upward web portions and the at least a pair of crossbeams provide a construction framework for the subfloor structure;

wherein the two upper external extensions each laterally extend from the upward web portions as a planar surface parallel to the floor surface, each of the upward web portions having a transitional location rigidly attached to the corresponding upper external extension, each transitional location being located proximal a top end portion of the corresponding upward web portion; and wherein the planar surface of each of the two upper external extensions extends outwardly and continuously from a respective upward web portion to a respective outer side shell for direct connection therewith, the planar surface of each of the two upper external extensions extending longitudinally across at least the pair of crossbeams.

2. The subfloor structure of claim 1, wherein the at least a pair of upper external extensions is formed integral with the subfloor bowl hull at the transitional locations, each corresponding upward web portion being attached to the corresponding upper external extension in a continuous merging into the adjacent horizontal extension at the corresponding transitional locations by forming a continuous curved transition.

3. The subfloor structure of claim 1, wherein the at least a pair of upper external extensions are initially constructed as separated parts, each upper external extension being attached at a corresponding upper transitional location at a top end of the corresponding upward web portion of the integral subfloor bowl hull by mechanical fastening means.

4. The subfloor structure of claim 1, wherein each upward web portion extends upwardly from the bottom central portion of the subfloor bowl hull to the transitional location located proximal a top end portion of the upward web portion, the upward web portion extending at least locally parallel to the anteroposterior plane and the transitional location extending atop the upward web portion below the floor surface.

5. The subfloor structure of claim 1, wherein the integral subfloor bowl hull spans over at least ⅔ of an overall longitudinal dimension of the subfloor structure below the floor surface.

6. The subfloor structure of claim 1, wherein the subfloor structure incorporates a lower portion of at least two main frames, the main frames being attached to the integral subfloor bowl hull by mechanical fastening means.

7. The subfloor structure of claim 1, wherein the integral subfloor bowl hull is a single-piece made of a composite material, the subfloor bowl hull having the bottom central portion and the integrated upward web portions constructed in a one shot curing step.

8. The subfloor structure of claim 1, wherein the integral subfloor bowl hull is made from a single sheet of metal.

9. The subfloor structure of claim 1, wherein the subfloor structure has horizontal extensions the outer ribs forming crossbeams being attached to the subfloor bowl hull at an outer portion of the upward web portions and at a lower portion of the horizontal extensions by mechanical fastening means.

10. The subfloor structure of claim 1, wherein each outer side shell is attached to the subfloor bowl hull in the vicinity of an outer portion of the lateral transition region to at least one outer rib forming a crossbeam and to a lower portion of the corresponding upper external extension, by mechanical fastening means.

11. The subfloor structure of claim 1, wherein the inner rib of one of the at least a pair of crossbeams is attached to an inner portion of the corresponding upward web portion and to an upper portion of the bottom central portion of the integral subfloor bowl hull by mechanical fastening means.

12. The subfloor structure of claim 1, wherein the floor panels include inner floor panels and outer floor panels, the subfloor structure having two upper external extensions flush with the floor plane and at least one of the inner floor panels attached to an upper portion of the subfloor bowl hull by mechanical fastening means, the two upper external extensions forming at least a part of the outer floor panels.

13. The subfloor structure of claim 1, wherein the lateral transition regions and the transitional locations each form a cross-sectional contour, the cross-sectional contour describing an all along, smooth and tangential continuity in a transverse plane perpendicular to a longitudinal direction of the subfloor structure.

14. A rotary wing aircraft comprising an airframe and a subfloor structure according to claim 1, wherein the subfloor structure comprises the integral subfloor bowl hull with integrated upward web portions and wherein the rotary wing aircraft is selected from a group consisting of helicopters, hybrid rotorcraft and UAV drone rotorcrafts.

15. A rotary wing aircraft comprising:
an airframe extending along an anteroposterior plane and defining an outer loft; and
a subfloor structure included within and delimited by the airframe as positioned within the outer loft, the subfloor structure comprising:
an integral subfloor bowl hull formed with two upward web portions integrally and jointlessly extending from a bottom central portion via two lateral transition regions to define a U-shaped one-piece having material and structural continuity and a pair of upper external extensions, the two lateral transition regions being opposed to one another relative to the anteroposterior plane, the two upward web portions extending at least locally along a longitudinal axis to provide two longerons for the subfloor structure such that the bottom central portion is delimited transversally by the two upward web portions, each of the pair of upper external extensions rigidly attached to a top end portion of a corresponding one of the upward web portions via a transitional location,
two outer side shells, each outer side shell attached to the integral subfloor bowl hull adjacent to a respective one of the two lateral transition regions, each outer side shells extending outwardly from the bottom central portion,
a first crossbeam having two outer crossbeam ribs, and an inner crossbeam rib, each outer crossbeam rib extending between a respective upward web portion and a respective outer side shell, the inner crossbeam rib extending between the two upward web portions,
a second crossbeam having another two outer crossbeam ribs, and another inner crossbeam rib, each outer crossbeam rib of the another outer crossbeam ribs extending between a respective upward web portion and a respective outer side shell, the another inner crossbeam rib extending between the two upward web portions, and
floor panels defining a floor surface perpendicular to an elevation direction of the anteroposterior plane;
wherein the bottom central portion of the integral subfloor bowl hull and the two outer side shells cooperate to form an outer bottom shell for the subfloor structure;
wherein each of the first and second crossbeams extend along a transverse direction orthogonal to the anteroposterior plane; and
wherein the two upward web portions and the first and second crossbeams cooperate to form a construction framework for the subfloor structure; and
wherein each of the pair of upper external extensions has a planar surface laterally extending from a respective upward web portion to a respective outer side shell for direct connection therewith and longitudinally extending across at least the first and second crossbeams, the planar surface of each of the upper external extensions extending in a plane parallel to the floor surface.

16. The aircraft of claim 15, wherein the floor panels are inner floor panels and are positioned between the pair of upper external extensions; and
wherein the pair of upper external extensions are flush with the floor panels, the pair of upper external extensions being outer floor panels.

17. A subfloor structure for a rotary wing aircraft having an airframe extending along an anteroposterior plane, the subfloor structure comprising:
an integral subfloor bowl hull formed with two upward web portions integrally extending from a bottom central portion via two lateral transition regions to define a U-shaped one-piece, the two lateral transition regions being opposed to one another relative to the anteroposterior plane, the two upward web portions extending at least locally along a longitudinal axis to provide two longerons for the subfloor structure such that the bottom central portion is delimited transversally by the two upward web portions, the subfloor bowl hull having a pair of upper external extensions, each upper external extensions laterally extending outwardly from a top end portion of a respective upward web portion via a transitional location, wherein the bottom central portion, the two lateral transition regions, the two upward web portions, and pair of upper external extensions have material and structural continuity;
two outer side shells, each outer side shell attached to the integral subfloor bowl hull adjacent to a respective one of the two lateral transition regions, each outer side shells extending outwardly from the bottom central portion;
a first crossbeam having two outer crossbeam ribs and an inner crossbeam rib, each outer crossbeam rib extending between a respective upward web portion and a respective outer side shell, the inner crossbeam rib extending between the two upward web portions;
a second crossbeam having another two outer crossbeam ribs and another inner crossbeam rib, each outer crossbeam rib of the another outer crossbeam ribs extending between a respective upward web portion and a respective outer side shell, the another inner crossbeam rib extending between the two upward web portions; and
floor panels defining a floor surface perpendicular to an elevation direction of the anteroposterior plane;
wherein each of the pair of upper external extensions provide a planar surface extending outwardly from a respective web portion to a respective outer side shell for direct connection therewith, the planar surface of each of the upper external extensions extending longitudinally across at least the first and second crossbeams, the planar surface of each of the upper external extensions extending in a plane parallel to the floor surface;
wherein the bottom central portion of the integral subfloor bowl hull and the two outer side shells cooperate to form an outer bottom shell for the subfloor structure shaped to be included with and delimited by the airframe;
wherein each of the first and second crossbeams extend along a transverse direction orthogonal to the anteroposterior plane; and
wherein the two upward web portions and the first and second crossbeams cooperate to form a construction framework for the subfloor structure.

18. The subfloor structure of claim 17 wherein the bottom central portion, the two upward web portions, and the pair of upper external extensions are provided jointlessly by a hat-shaped single-piece composite.

19. The subfloor structure of claim 17 wherein the planar surface of each of the upper external extensions extends continuously between the respective web portion, the respective outer side shell, and the first and second crossbeams.

20. The subfloor structure of claim 17 wherein the planar surface of each of the upper external extensions extends longitudinally and directly adjacent to the respective outer side shell across at least the first and second crossbeams.

* * * * *